US011172671B2

United States Patent
Liu

(10) Patent No.: US 11,172,671 B2
(45) Date of Patent: Nov. 16, 2021

(54) MULTIFUNCTION INFRARED INDUCTION WATER SPRINKLER

(71) Applicant: Yu-Chen Liu, Guangdong (CN)

(72) Inventor: Yu-Chen Liu, Guangdong (CN)

(73) Assignee: Handle Tech (SZ) Co., Ltd., Guangdong (CN)

( * ) Notice: Subject to any disclaimer, the term of this patent is extended or adjusted under 35 U.S.C. 154(b) by 729 days.

(21) Appl. No.: 15/866,486

(22) Filed: Jan. 10, 2018

(65) Prior Publication Data
US 2018/0125057 A1 May 10, 2018

(30) Foreign Application Priority Data

Sep. 29, 2017 (CN) .......................... 201721266078.3

(51) Int. Cl.
*A01M 29/00* (2011.01)
*G08B 13/19* (2006.01)
*A01G 25/16* (2006.01)
*A01G 27/00* (2006.01)
*G01J 5/00* (2006.01)
*G01J 5/02* (2006.01)

(52) U.S. Cl.
CPC ........... *A01M 29/00* (2013.01); *A01G 25/165* (2013.01); *A01G 27/003* (2013.01); *G01J 5/0025* (2013.01); *G01J 5/0275* (2013.01); *G08B 13/19* (2013.01); *Y02A 40/22* (2018.01)

(58) Field of Classification Search
CPC ......... B05B 12/00; B05B 12/02; B05B 12/08; B05B 12/12; B05B 12/122; B05B 12/124; B05B 12/126

USPC ......................................... 239/63, 67, 68, 69
See application file for complete search history.

(56) References Cited

U.S. PATENT DOCUMENTS 4,795,092 A * 1/1989 Fuller ....................... B05B 1/10
239/12
5,009,192 A * 4/1991 Burman ............... A01K 15/023
119/720

(Continued)

OTHER PUBLICATIONS

"IR Sensor Module Pinout, Features & Datasheet" Aug. 30, 2018 (https://components101.com/sensors/ir-sensor-module) (Year: 2018).*

*Primary Examiner* — Viet Le
(74) *Attorney, Agent, or Firm* — Raymond Y. Chan; David and Raymond Patent Firm

(57) ABSTRACT

A multifunctional infrared induction water sprinkler includes a water inlet pipe (10), an infrared induction control device (20) connected with the water inlet pipe (10), and a water outlet device (30), wherein the water outlet device (30) is connected with the infrared induction control device (20) through a universal joint (301); the infrared induction control device (20) includes an infrared pyroelectric probe, a pre-amplifier, a central processing unit, an electromagnetic valve actuator and an electromagnetic valve which are connected in sequence, and further includes an irrigating/repelling selection controller, a sprinkling duration regulator and a sprinkling interval regulator which are connected with the central processing unit. The multifunctional infrared induction water sprinkler can effectively repel animals to protect gardens, lawns and nursery gardens against damage and can also automatically spray water to irrigate gardens, lawns, nursery gardens and the like, and water resources can be saved.

10 Claims, 5 Drawing Sheets

(56) References Cited

U.S. PATENT DOCUMENTS

| | | | | |
|---|---|---|---|---|
| 5,144,767 A * | 9/1992 | McCloy | A01M 7/0089 | 47/1.7 |
| 5,322,717 A * | 6/1994 | Killian | A47G 7/041 | 239/69 |
| 5,535,545 A * | 7/1996 | Matz | F21V 21/0824 | 47/33 |
| 5,711,329 A * | 1/1998 | Soon | E03C 1/0412 | 134/115 R |
| 5,878,956 A * | 3/1999 | Djukastein | A01G 25/165 | 239/69 |
| 5,931,233 A * | 8/1999 | La Bonte | A62C 2/08 | 169/13 |
| 6,443,365 B1 * | 9/2002 | Tucker | A01M 7/0089 | 239/155 |
| 6,611,289 B1 * | 8/2003 | Yu | H04N 9/045 | 348/265 |
| 6,942,826 B2 * | 9/2005 | Mbachu | B27G 11/00 | 264/40.1 |
| 6,997,642 B2 * | 2/2006 | Bishop, Jr. | A01B 45/02 | 137/78.3 |
| 7,168,632 B2 * | 1/2007 | Kates | A01G 25/167 | 239/69 |
| 7,203,576 B1 * | 4/2007 | Wilson | A01G 25/165 | 137/78.3 |
| 7,231,298 B2 * | 6/2007 | Hnilica-Maxwell | A01G 2/00 | 702/3 |
| 7,584,023 B1 * | 9/2009 | Palmer | A01G 27/00 | 239/69 |
| 7,750,805 B2 * | 7/2010 | Leggett | G08B 15/02 | 340/541 |
| 7,789,321 B2 * | 9/2010 | Hitt | A01G 25/167 | 239/63 |
| 7,913,653 B2 * | 3/2011 | Jordan | A01K 15/023 | 119/859 |
| 8,028,470 B2 * | 10/2011 | Anderson | A01G 25/167 | 47/48.5 |
| 8,215,570 B2 * | 7/2012 | Hitt | A01G 25/167 | 239/63 |
| 9,226,493 B2 * | 1/2016 | Garcia | A01M 31/002 | |
| 9,265,204 B2 * | 2/2016 | Younis | A01G 25/165 | |
| 9,333,520 B2 * | 5/2016 | McLain | E03F 7/10 | |
| 10,426,080 B2 * | 10/2019 | Jugovich | B05B 13/005 | |
| 10,586,353 B2 * | 3/2020 | Yoshimura | A01G 7/045 | |
| 2004/0074980 A1 * | 4/2004 | Ekelof | B63G 13/02 | 239/2.1 |
| 2006/0131441 A1 * | 6/2006 | Ivans | A01G 25/16 | 239/104 |
| 2006/0131442 A1 * | 6/2006 | Ivans | B05B 3/14 | 239/104 |
| 2007/0056753 A1 * | 3/2007 | Serrano Molina | A62C 3/0271 | 169/60 |
| 2007/0102538 A1 * | 5/2007 | Kates | A01G 25/167 | 239/200 |
| 2008/0027586 A1 * | 1/2008 | Hern | A01G 25/167 | 700/284 |
| 2008/0033601 A1 * | 2/2008 | Habing | A63B 9/00 | 700/284 |
| 2010/0012744 A1 * | 1/2010 | Kates | B05B 3/021 | 239/11 |
| 2010/0032493 A1 * | 2/2010 | Abts | A01G 25/092 | 239/11 |
| 2012/0153043 A1 * | 6/2012 | Arekar | F16K 31/025 | 239/200 |
| 2012/0273587 A1 * | 11/2012 | Hitt | A01G 25/167 | 239/63 |
| 2013/0043328 A1 * | 2/2013 | Williams | A62C 37/08 | 239/288 |
| 2013/0090766 A1 * | 4/2013 | Pfrenger | G05B 15/02 | 700/275 |
| 2013/0112765 A1 * | 5/2013 | Mercnik | A01G 25/00 | 239/1 |
| 2013/0153673 A1 * | 6/2013 | Younis | A01G 25/16 | 239/1 |
| 2013/0277451 A1 * | 10/2013 | Gilpatrick | A01G 25/145 | 239/68 |
| 2014/0001283 A1 * | 1/2014 | Nievas | E01C 11/26 | 239/69 |
| 2014/0263687 A1 * | 9/2014 | Rich | A01M 29/30 | 239/1 |
| 2014/0312141 A1 * | 10/2014 | Ravishankar | B05B 1/3026 | 239/63 |
| 2014/0346243 A1 * | 11/2014 | Rich | A01M 29/00 | 239/1 |
| 2015/0351309 A1 * | 12/2015 | Gaus | A01B 76/00 | 172/1 |
| 2016/0183484 A1 * | 6/2016 | Richings, Sr. | A01G 25/167 | 239/11 |
| 2016/0355258 A1 * | 12/2016 | Williams | B05B 13/005 | |
| 2017/0325444 A1 * | 11/2017 | Crinklaw | B05B 9/06 | |
| 2018/0264640 A1 * | 9/2018 | Holloway | B25J 1/08 | |
| 2018/0333731 A1 * | 11/2018 | Orita | G01J 5/089 | |
| 2019/0045980 A1 * | 2/2019 | Yu | A47K 3/28 | |
| 2019/0262849 A1 * | 8/2019 | Tang | B05B 12/10 | |
| 2020/0120861 A1 * | 4/2020 | Rich | A01C 19/02 | |
| 2020/0122176 A1 * | 4/2020 | Floyd | G06N 3/08 | |
| 2020/0221681 A1 * | 7/2020 | Schwaderer | B05B 12/12 | |
| 2020/0230633 A1 * | 7/2020 | Serrat | G06T 7/70 | |

* cited by examiner

MULTIFUNCTION INFRARED INDUCTION WATER SPRINKLER

BACKGROUND OF THE INVENTION

Technical Field

The invention relates to a water sprinkling device, in particular, to a multifunctional infrared induction water sprinkler.

Description of Related Art

Certain birds and animals usually trample on flowers, grass and seedlings in gardens, lawns, green lands and small vegetable gardens, and consequentially the flowers, grass and seedlings are damaged. All measures are tried by people to repel the animals, and in previous times, dummies were used for repelling animals, or plastic bags blown by wind are used for deterring animals, and sounds are also used for repelling animals. However, the effects of all these methods are limited, and an effective animal repelling effect cannot be achieved.

BRIEF SUMMARY OF THE INVENTION

To overcome the defect that a method for effectively repelling animals in gardens, lawns or green lands, and vegetable gardens is not available in the prior art, the invention provides a multifunctional infrared induction water sprinkler with a good repelling effect.

According to the technical scheme adopted by the invention for solving the technical problems: a multifunctional infrared induction water sprinkler comprises a water inlet pipe, an infrared induction control device connected with the water inlet pipe, and a water outlet device, wherein the infrared induction control device controls the water outlet device to spray water, and the water outlet device is connected with the infrared induction control device through a universal joint.

According to the multifunctional infrared induction water sprinkler of the invention, the infrared induction control device comprises an infrared pyroelectric probe, a pre-amplifier, a central processing unit, an electromagnetic valve actuator and an electromagnetic valve which are connected in sequence.

The multifunctional infrared induction water sprinkler of the invention further comprises an infrared induction distance adjuster which is connected with the pre-amplifier.

According to the multifunctional infrared induction water sprinkler of the invention, the central processing unit is further connected with an irrigating/repelling selection controller and an operating time selection controller and judges whether an electromagnetic valve control signal needs to be output or not according to the state of the irrigating/repelling selection controller and the state of the operating time selection controller.

According to the multifunctional infrared induction water sprinkler of the invention, the central processing unit is further connected with a photosensitive detector, and the operating time selection controller can be in a daytime operating mode or a night operating mode or a 24-hour operating mode.

According to the multifunctional infrared induction water sprinkler of the invention, the infrared induction control device further comprises a sprinkling duration regulator connected with the central processing unit.

According to the multifunctional infrared induction water sprinkler of the invention, the infrared induction control device further comprises a sprinkling interval regulator connected with the central processing unit.

According to the multifunctional infrared induction water sprinkler of the invention, the water inlet pipe is further connected with a multifunction blending box.

The multifunctional infrared induction water sprinkler of the invention further comprises a base provided with a load.

According to the multifunctional infrared induction water sprinkler of the invention, a water inlet is formed in the base and connected with the water inlet pipe, and the water inlet is provided with a standby water faucet.

The multifunctional infrared induction water sprinkler of the invention has the following beneficial effects that compared with the prior art, the infrared induction control device and the water outlet device are arranged, and the water outlet device is connected with the infrared induction control device through the universal joint so that the sprinkling elevation angle can be greatly adjusted, and accordingly animals nearby or in the distance can be repelled; the repelling effect is further improved through the infrared induction distance adjuster; the irrigation function and control over the operating time of the water sprinkler can be achieved through the irrigating/repelling selection controller and the operating time selection controller; through the cooperation of the sprinkling duration regulator and the sprinkling interval regulator, nursery gardens, flowers and grass can be cyclically irrigated automatically, water resources are well saved, and irrigation is made more convenient. As the multifunctional blending box is arranged, the water sprinkler of the invention not only can be used for irrigation, but also can be used for spraying nutrient solutions to provide nutrients for plans; in addition, animal-sensitive powdery or aqueous agents can also be placed in the blending box to serve as additive enhancers used for repelling animals, and thus the repelling effect is better.

BRIEF DESCRIPTION OF THE SEVERAL VIEWS OF THE DRAWINGS

A further description of the invention is given with accompanying drawings and embodiments as follows, in the drawings.

DETAILED DESCRIPTION OF THE INVENTION

For a clearer understanding of the purposes, technical schemes and advantages of the invention, a further detailed description of the invention is given with the accompanying drawings and embodiments as follows. It should be understood that the specific embodiment in the following description is only used for explaining the invention instead of being used for limiting the invention.

Figure 1:
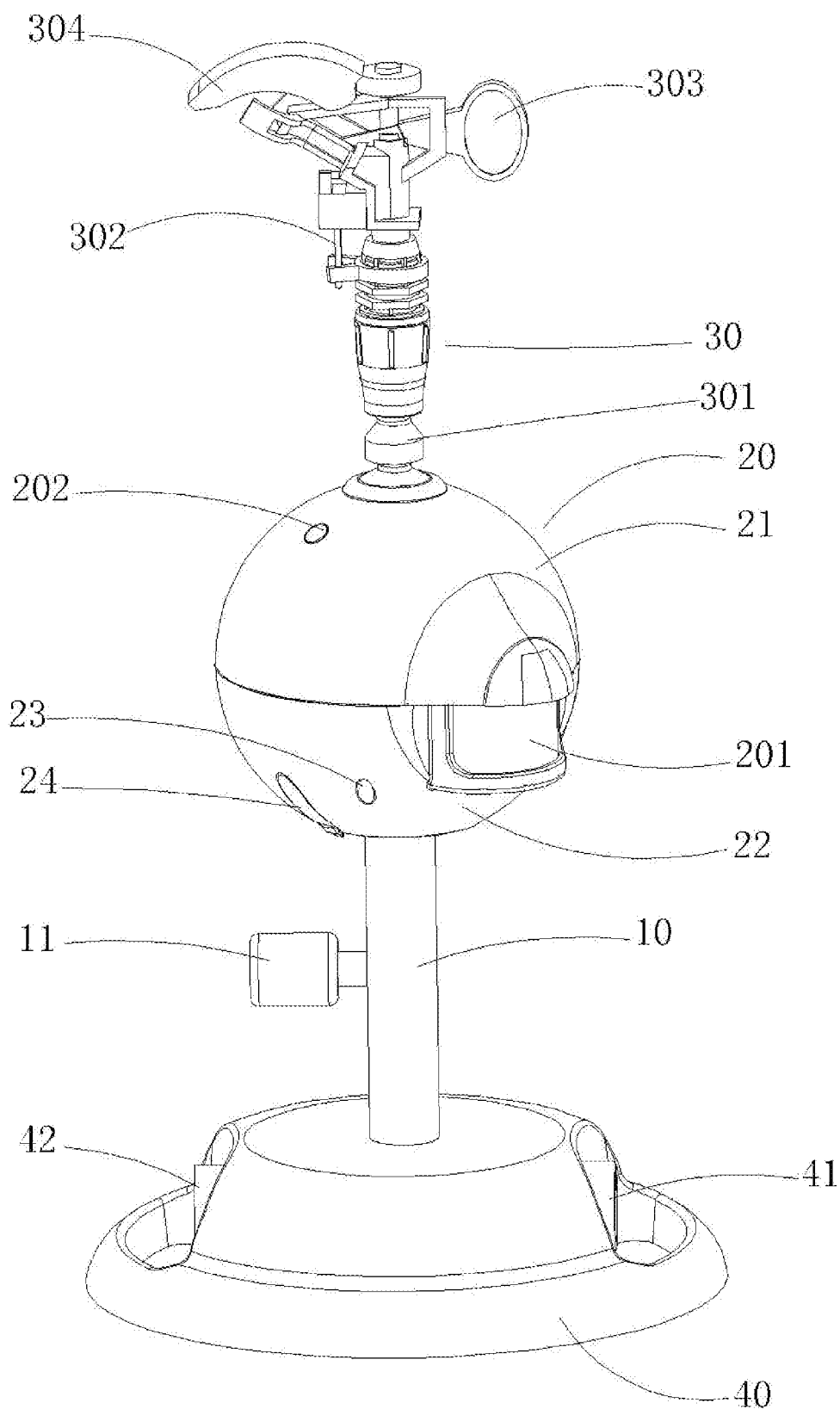
FIG. 1 is an overall structural diagram of a multifunctional infrared induction water sprinkler of the invention.
Figure 3:
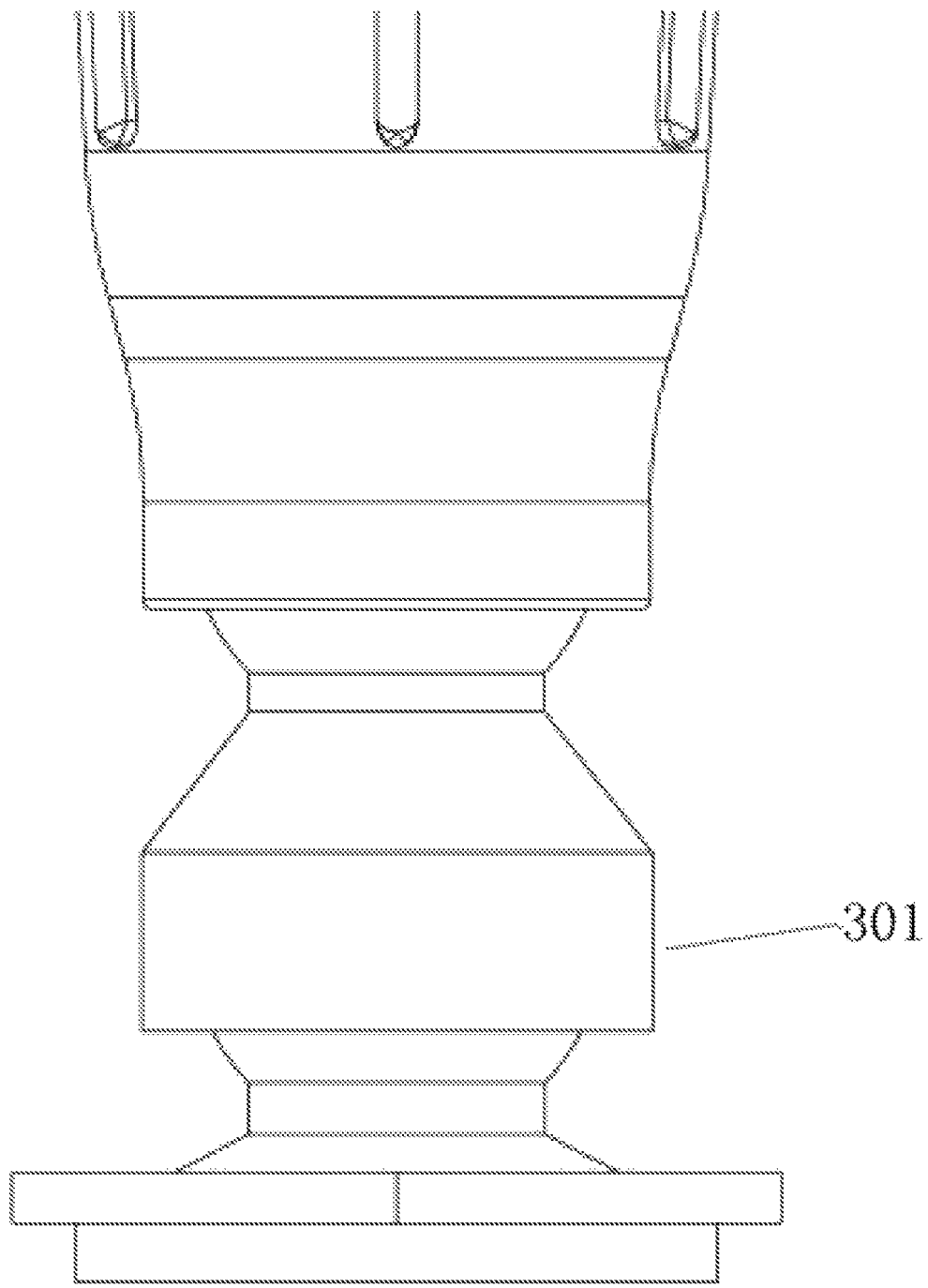
FIG. 3 is a local structural enlarged drawing of a universal joint of the invention.

As is shown in FIG. 1, a multifunctional infrared induction water sprinkler comprises a water inlet pipe 10, and the water inlet pipe 10 is connected with an infrared induction control device 20 and a water outlet device 30; all objects can emit infrared rays, and the higher the temperature is, the higher the intensity of infrared rays is; the infrared induction control device 20 receives mobile infrared rays through an infrared pyroelectric probe so as to judge whether an object is an animal or not, intelligent recognition is conducted when the probe induces mobile infrared rays or variable strong-weak infrared rays, and if the object is an animal, the water outlet device 30 is controlled to spray out water mist to repel the animal; the water outlet device 30 is connected with the infrared induction control device 20 through a universal joint 301, as is shown in FIG. 3, the universal joint 301 is a movable joint and can rotate freely, and thus a sprinkler head 303 can be adjusted by a large elevation angle; the horizontal angle and the sprinkling direction of a sprinkler nozzle 304 can be adjusted through a sprinkling angle regulator 302 located at the upper end of the universal joint and connected with the sprinkler head 303, and thus water mist can be sprinkled at any angle; when animals in the distance or nearby are repelled and water needs to be sprayed at a special angle, the required spraying effect can be achieved by adjusting the universal joint, so that actual requirements are met, and animals can be effectively repelled.

Figure 2:
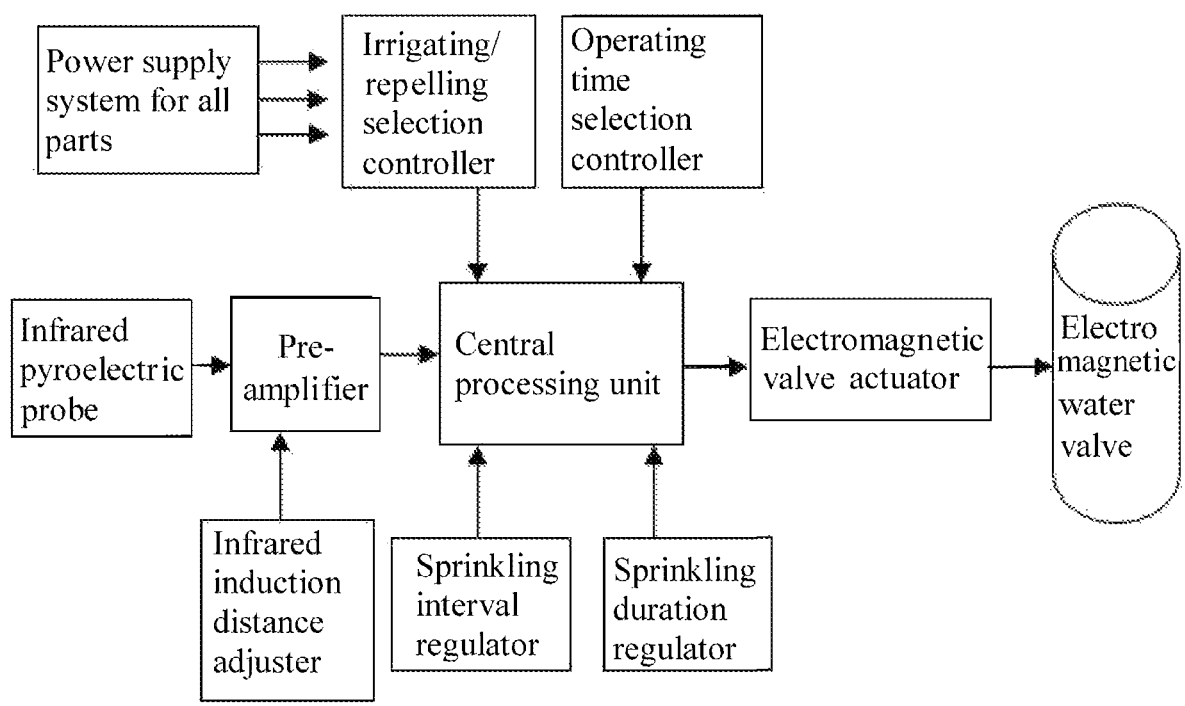
FIG. 2 is a circuit block diagram of the multifunctional infrared induction water sprinkler of the invention.

Specifically, as is shown in FIG. 1 and FIG. 2, the infrared induction control device 20 comprises the infrared pyroelectric probe, a pre-amplifier, a central processing unit, an electromagnetic valve actuator and an electromagnetic valve which are arranged in sequence. As is shown in FIG. 1, the infrared induction control device 20 is located in a shell which is of a spherical structure and is composed of an upper cover 21 and a lower cover 22, an infrared induction window 201 is arranged on the interface of the upper cover 21 and the lower cover 22 and located on the lower cover 22, and the infrared pyroelectric probe is located in the infrared induction window 201; the lower cover 22 is provided with a screw hole 23 used for fixing the upper cover 21 and the lower cover 22 together, and a supply hub 24. When the water sprinkler operates, the infrared pyroelectric probe detects infrared rays emitted by animals through the infrared induction window 201, then an infrared ray signal is amplified through the pre-amplifier and sent to the central processing unit, whether the infrared probe is triggered by animals or not is intelligently identified, and if the infrared probe is triggered by animals, an electromagnet valve control signal is output, the electromagnetic valve is opened to spray out water mist, and thus animals are repelled.

Furthermore, the infrared induction control device 20 comprises an infrared induction distance adjuster, and the infrared induction distance adjuster is connected with the pre-amplifier. The infrared induction distance adjuster is mainly used for adjusting the infrared ray receiving distance of the infrared pyroelectric probe; when the water sprinkler operates, the infrared induction distance is adjusted, a water pipe is connected to the water sprinkler, the water valve is opened, the infrared induction area, namely the infrared pyroelectric probe, is made to face protected flowers, grass and seedlings; when an animal is about to approach the protected area, the infrared pyroelectric probe detects an infrared ray signal emitted by the animal at the moment, and if it is judged through analysis by the central processing unit that the animal approaches, the electromagnetic water valve is opened to spray out a water column, and the water column swings left and right to repel the animal away. The intensities of infrared ray signals emitted by different animals are different, and the infrared induction distance adjuster can be adjusted to make the infrared pyroelectric probe receive infrared ray signals emitted by different types of animals, so that the selective adaptability to animals of different types is improved, and meanwhile, the repelling effect of the water sprinkler on animals which are different distances away is further improved.

Furthermore, the central processing unit is further connected with an irrigating/repelling selection controller and an operating time selection controller; through the irrigating/repelling selection controller, the water sprinkler of the invention not only can be used for repelling animals, but also can be used for irrigating flowers, grass and plants, and the application range of the water sprinkler is widened; through the operating time selection controller, the operating time of the water sprinkler can be selected and controlled, the central processing unit operates to judge whether an electromagnetic valve control signal needs to be output or not according to the state of the irrigating/repelling selection controller and the state of the operating time selection controller, and thus whether the water sprinkler needs to sprinkle water or not is intelligently controlled.

Furthermore, the operating time selection controller can be set in a daytime operating mode, a night operating mode or a 24-hour operating mode; the scene in the daytime and the scene at night are distinguished through a photosensitive detector 202 located on the upper cover 21, the photosensitive 202 transmits an outside light signal to the central processing unit, and after the outside light signal is processed by the central processing unit, whether the water sprinkler needs to operate or not is determined according to the state of the operating time selection controller. In this way, the water sprinkler can be kept in the operating state in the daytime or at night or in 24 hours selectively according to actual requirements of users; meanwhile, after the time limits are set, waste of water resources caused by continuous operating of the water sprinkler is avoided.

Furthermore, the infrared induction control device comprises a sprinkling duration regulator and a sprinkling interval regulator which are connected with the central processing unit. The sprinkling duration can be set according to requirements through the sprinkling duration regulator, the central processing unit determines the duration of an output electromagnetic valve control signal according to the set condition of the sprinkling duration regulator, and thus the electromagnetic water valve can be closed in real time; compared with the prior art that the sprinkling duration cannot be set, the purpose of saving water resources is achieved; through the sprinkling interval regulator, the sprinkling duration and the sprinkling interval can be set in absence of infrared induction, and thus plants, flowers and grass in parks and gardens can be irrigated automatically. When the irrigation function is selected, the sprinkling duration and the sprinkling interval are regulated, the operating time selection controller is set to operate in the daytime operating mode (or the night operating mode or the 24-hour operating mode), then the transverse sprinkling angle and the longitudinal sprinkling angle are adjusted, and then water can be automatically sprinkled to irrigate vegetable gardens, flower beds, lawns and the like according to the set sprinkling duration and the set sprinkling time interval without infrared induction.

Figure 4:
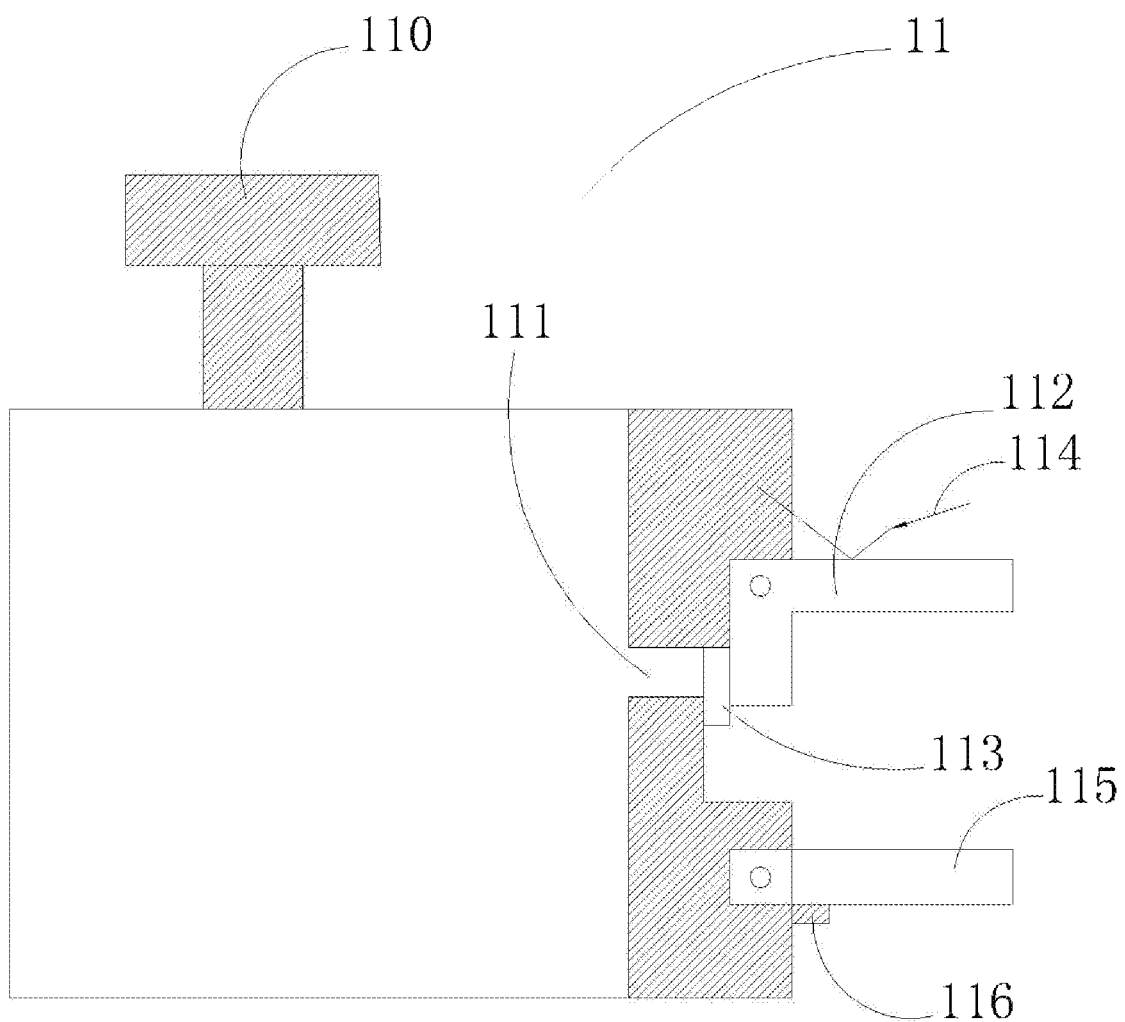
FIG. 4 is a structural diagram of a blending box of the invention.

Furthermore, as is shown in FIG. 1, the water inlet pipe 10 is further connected with a multifunctional blending box 11. As is shown in FIG. 4, a liquid adding port 110 is formed in the upper portion of the blending box 11, and a blended liquid outlet 111 is formed in the side, connected with the water inlet pipe 10, of the blending box 11; a water flow switch 112 is provided with a sealing rubber structure 113 used for sealing the blended liquid outlet 111, a pressure spring 114 is arranged on the upper portion of the water flow switch 112 and used for providing sealing force for the water flow switch 112 to seal the blended liquid outlet 111, an anti-backflow baffle 115 is further arranged below the blended liquid outlet 111, and a stop block 116 is arranged below the anti-backflow baffle 115 and used for supporting the anti-backflow baffle 115. After water enters the water inlet pipe 10, the anti-backflow baffle 115 and the water flow switch 112 are rushed open, liquid in the blending box 11 is then mixed into water to be sprayed out, and the water flow switch 112 and the anti-backflow baffle 115 can return to the original positions after water sprinkling is stopped, so that on the one hand, blended liquid in the blending box is prevented flowing back, and on the other hand, the blended liquid outlet of the blending box is closed; meanwhile, the anti-backflow baffle 115 prevents blended liquid left in the water inlet pipe 10 from flowing back into the portion, below the blending box 11, of the water inlet pipe 10, and thus pollution to a raw water source is avoided. The blending box is additionally arranged on the water sprinkler, and liquid such as a plant nutrient solution is added into the blending box, the liquid in the blending box flows into the water inlet pipe only when water is sprayed and is sprayed out after being mixed with water. For example, when plants in a garden are irrigated and a nutrient solution needs to be sprayed onto the plants, the user just needs to screw the blending box down from the water sprinkler, fill the blending box with the nutrient solution and then screw the blending box back onto the water sprinkle again, the nutrient solution in the blending box cannot flow into water at the moment, and the nutrient solution can be mixed with water and then sprayed to the plants only after the water flow switch is triggered by sprayed water flow; animal-sensitive powdery or aqueous agents can also be added into the blending box 11, and the liquid or powdery agents in the blending box cannot flow out to pollution the water source without water flow impact. In this way, compared with the prior art that only tap water can be sprayed, the application range of the water sprinkler of the invention is further widened through the multifunctional blending box.

Figure 5:
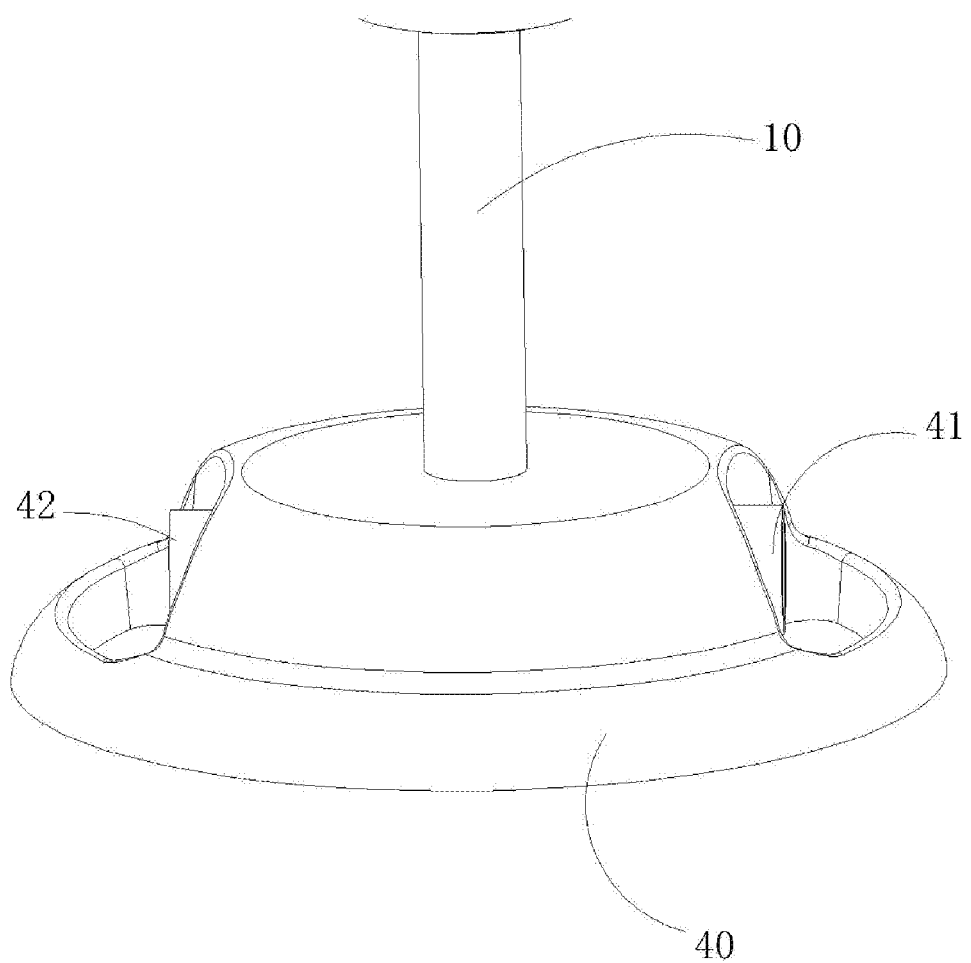
FIG. 5 is a structural diagram of a base of the invention.

Furthermore, the water sprinkler of the invention comprises a base 40, and as is shown in FIG. 5, the base 40 is provided with a load (located below the base and not shown in the FIGS). The base 40 is a fixed base; an existing water sprinkler is not provided with a base, can only be inserted into soft soil through a ground insert (a pointed object located at the lower end of the water sprinkler) so as to be fixed, and cannot be used on hard ground, and consequentially, the application range is limited. The big base and the load are adopted by the water sprinkler of the invention to replace the ground insert, so that the water sprinkler can be placed on hard ground and flat soft soil and in other environment; the load is added, so that the water sprinkler is prevented from inclining when spraying water, and thus the user can use the water sprinkler quite conveniently. As is shown in FIG. 5, the water sprinkler of the invention can be directly placed on flat hard road surfaces or soft road surfaces through the big chassis type base, and the load is additionally arranged on the base, so that the water sprinkle is prevented from falling when spraying water and can be used more conveniently.

Furthermore, the base 40 is provided with a water inlet 41 connected with the water inlet pipe 10; the water inlet 41 is formed in the base 40, so that the center of gravity is low when water is sprayed, the stability of the water sprinkler in use is improved, the situation that the center of gravity is instable when a water inlet is arranged at a high position, and consequentially the water sprinkle falls is avoided, and the water inlet 41 is provided with a standby water faucet 42. The standby water faucet is additionally arranged, so that when the user needs an extra water connector in use, the user just needs to turn on the standby water faucet 42 and then connect a water pipe to the standby water faucet 42; meanwhile, the standby water faucet 42 can also be connected to another one or more water sprinklers through water pipes, and thus the water sprinkling area is enlarged. The standby water faucet 42 is covered with a leakage-proof cover when not used. Through the standby water faucet, the user can use extra water connectors conveniently, and the using convenience of the water sprinkler is further improved.

From the above embodiment, the multifunctional infrared induction water sprinkler of the invention can prevent gardens, lawns, nursery gardens and the like from being infringed by animals and can also effectively repel animals; in addition, the multifunctional infrared induction water sprinkler can be used for automatically irrigating plants in flower gardens, vegetable gardens and the like and spraying nutrient solutions onto the plants. The multifunctional infrared induction water sprinkler of the invention is wide in application range and has good market application prospects.

Although the invention is disclosed through the above embodiment, the protection scope of the invention is not limited to the above embodiment, and transformations, substitutes and the like of the above components made without deviating from the concept of the invention are all within the claim range of the invention.

What is claimed is:

1. A multifunction infrared induction water sprinkler, comprising:
   a base;
   a water inlet pipe upwardly extended from said base;
   an infrared induction control device which comprises a shell, comprising an upper cover and a lower cover, connected to said water inlet pipe, an infrared induction window formed at said upper cover of said shell, and an infrared pyroelectric probe located at said infrared induction window for detecting an infrared ray signal through said infrared induction window for animal detection;
   a water outlet device which comprises a sprinkler nozzle communicating with said water inlet pipe for spraying water, wherein said water outlet device is actuated between an irrigating operation and a repelling operation, wherein at said irrigating operation, said water outlet device is operated in a time interval manner to spray the water via said sprinkler nozzle for irrigation, wherein at said repelling operation, said infrared pyroelectric probe is triggered in response to a presence of an animal to operate said water outlet device for spraying the water via said sprinkler nozzle so as to repel the animal; and
   a multifunction blending box connected to said water inlet pipe for containing nutrient solution, wherein said multifunction blending box comprises a liquid adding port provided at an upper portion thereof, a blended liquid outlet connected to said water inlet pipe, a water flow switch operatively connected to said blended liquid outlet, a pressure spring arranged on an upper portion of said water flow switch for providing a sealing force at said water flow switch to seal said blended liquid outlet, an anti-backflow baffle arranged below said blended liquid outlet, and a stop block arranged below said anti-backflow baffle for supporting said anti-backflow baffle, wherein at said irrigating operation, said anti-backflow baffle and said water flow switch are open for enabling the nutrient solution in said multifunction blending box to mix into the water to be sprayed out at said sprinkler nozzle.

2. The multifunction infrared induction water sprinkler, as recited in claim 1, wherein said water outlet device further comprises a sprinkler head connected to said sprinkler nozzle, an universal joint which connects to said shell of said infrared induction control device to enable said water outlet device being freely rotated so as to adjust an elevation angle and a horizontal angle of said sprinkler head, and a sprinkling angle regulator located at an upper end of said universal joint and connected to said sprinkler head for adjusting a sprinkling direction of said sprinkler nozzle.

3. The multifunction infrared induction water sprinkler, as recited in claim 2, wherein said shell is formed in spherical shape, wherein said upper cover is coupled to said universal joint, and said lower cover is connected to said water inlet pipe.

4. The multifunction infrared induction water sprinkler, as recited in claim 3, wherein said infrared induction control device further comprises a pre-amplifier, a central processing unit, an electromagnetic valve actuator and an electromagnetic valve which are connected in sequence, wherein said pre-amplifier is configured to amplify said infrared ray signal before sending to said central processing unit, wherein in response to a presence of the animal detected by said infrared ray signal, said electromagnetic valve actuator outputs an electromagnetic valve control signal to open said electromagnetic valve for spraying out water at said sprinkler nozzle.

5. The multifunction infrared induction water sprinkler, as recited in claim 4, wherein said infrared induction control device further comprises an infrared induction distance adjuster which is connected with said pre-amplifier for adjusting an infrared induction distance of said infrared pyroelectric probe.

6. The multifunction infrared induction water sprinkler, as recited in claim 4, wherein said infrared induction control device further comprises:
  an irrigating/repelling selection controller connected to said central processing unit;
  an operating time selection controller connected to said central processing unit, wherein said central processing unit is configured to judge whether said electromagnetic valve control signal needs to be output or not according to a state of said irrigating/repelling selection controller and a state of said operating time selection controller;
  a photosensitive detector which is located at said upper cover and is connected to said central processing unit for processing light signal so as to determine whether said water outlet device need to actuate or not at said irrigating operation, wherein said operating time selection controller is set among a daytime operating mode, a night operating mode and a 24-hour operating mode to actuate said water outlet device in a time interval manner; and
  a sprinkling duration regulator connected with said central processing unit, and a sprinkling interval regulator connected with said central processing unit.

7. The multifunction infrared induction water sprinkler, as recited in claim 1, wherein said base comprises a water inlet connected to said water inlet pipe and formed in said base for lower a center of gravity of said base, and a standby water faucet for connecting with additional multifunction infrared induction water sprinkler.

8. A multifunction infrared induction water sprinkler, comprising:
  a base which comprises an upper cover and a lower cover;
  a water inlet pipe upwardly extended from said base;
  an infrared induction control device which comprises a shell, comprising an upper cover and a lower cover, connected to said water inlet pipe, an infrared induction window formed at said upper cover of said shell, a central processing unit, and an infrared pyroelectric probe located at said infrared induction window for detecting temperature in form of an infrared ray signal from an object through said infrared induction window, wherein said central processing unit receives the infrared ray signal for determining an intensity of the infrared signal so as to determine whether the object is an animal or not;
  a water outlet device which comprises a sprinkler nozzle communicating with said water inlet pipe for spraying water, wherein said water outlet device is actuated between an irrigating operation and a repelling operation, wherein at said irrigating operation, said water outlet device is operated in a time interval manner to spray the water via said sprinkler nozzle for irrigation, wherein at said repelling operation, said infrared pyroelectric probe is triggered in response to a presence of an animal to operate said water outlet device for spraying the water via said sprinkler nozzle so as to repel the animal; and
  a multifunction blending box connected to said water inlet pipe for containing nutrient solution, wherein said multifunction blending box comprises a liquid adding port provided at an upper portion thereof, a blended liquid outlet connected to said water inlet pipe, a water flow switch operatively connected to said blended liquid outlet, a pressure spring arranged on an upper portion of said water flow switch for providing a sealing force at said water flow switch to seal said blended liquid outlet, an anti-backflow baffle arranged below said blended liquid outlet, and a stop block arranged below said anti-backflow baffle for supporting said anti-backflow baffle, wherein at said irrigating operation, said anti-backflow baffle and said water flow switch are open for enabling the nutrient solution in said multifunction blending box to mix into the water to be sprayed out at said sprinkler nozzle.

9. A multifunction infrared induction water sprinkler, comprising:
  a base;
  a water inlet pipe upwardly extended from said base;
  an infrared induction control device which comprises:
    a shell, comprising an upper cover and a lower cover, connected to said water inlet pipe,
    an infrared induction window formed at said upper cover of said shell, a central processing unit,
    an infrared pyroelectric probe located at said infrared induction window for detecting temperature in form of an infrared ray signal from an object through said infrared induction window, wherein said central processing unit receives said infrared ray signal for determining an intensity of the infrared signal so as to determine whether the object is an animal or not, wherein said shell is formed in spherical shape,
    a pre-amplifier, an electromagnetic valve actuator and an electromagnetic valve which are connected in sequence, wherein said pre-amplifier is configured to amplify said infrared ray signal before sending to said central processing unit, wherein said infrared induction control device further comprises an infrared induction distance adjuster which is connected with said pre-amplifier for adjusting an infrared induction distance of said infrared pyroelectric probe, an irrigating/repelling selection controller and an operating time selection controller connected to said central processing unit, wherein said central processing unit is configured to judge whether said electromagnetic valve control signal needs to be output or not according to a state of said irrigating/repelling selection controller and a state of said operating time selection controller, a photosensitive detector which is located at said upper cover and is connected to said central processing unit for processing light signal so as to determine whether said water outlet device need to actuate or not at said irrigating operation, wherein said operating time selection controller is set among a daytime operating mode, a night operating mode and a 24-hour operating mode to actuate said water outlet device in a time interval manner, a sprinkling duration regulator connected with said central processing unit, and a sprinkling interval regulator connected with said central processing unit;

a water outlet device which comprises a sprinkler nozzle communicating with said water inlet pipe for spraying water, wherein said water outlet device is actuated between an irrigating operation and a repelling operation, wherein at said irrigating operation, said water outlet device is operated in a time interval manner to spray the water via said sprinkler nozzle for irrigation, wherein at said repelling operation, said infrared pyroelectric probe is triggered in response to a presence of an animal to operate said water outlet device for spraying the water via said sprinkler nozzle so as to repel the animal, wherein said water outlet device further comprises a sprinkler head connected to said sprinkler nozzle, an universal joint which connects to said shell of said infrared induction control device to enable said water outlet device being freely rotated so as to adjust an elevation angle and a horizontal angle of said sprinkler head, and a sprinkling angle regulator located at an upper end of said universal joint and connected to said sprinkler head for adjusting a sprinkling direction of said sprinkler nozzle, wherein said upper cover is coupled to said universal joint, and said lower cover is connected to said water inlet pipe, wherein in response to a presence of the animal detected by said infrared ray signal, said electromagnetic valve actuator outputs an electromagnetic valve control signal to open said electromagnetic valve for spraying out water at said sprinkler nozzle; and a multifunction blending box connected to said water inlet pipe for containing nutrient solution, wherein said multifunction blending box comprises a liquid adding port provided at an upper portion thereof, a blended liquid outlet connected to said water inlet pipe, a water flow switch operatively connected to said blended liquid outlet, a pressure spring arranged on an upper portion of said water flow switch for providing a sealing force at said water flow switch to seal said blended liquid outlet, an anti-backflow baffle arranged below said blended liquid outlet, and a stop block arranged below said anti-backflow baffle for supporting said anti-backflow baffle, wherein at said irrigating operation, said anti-backflow baffle and said water flow switch are open for enabling the nutrient solution in said multifunction blending box to mix into the water to be sprayed out at said sprinkler nozzle.

10. The multifunction infrared induction water sprinkler, as recited in claim 9, wherein said base comprises a water inlet connected to said water inlet pipe and formed in said base for lower a center of gravity of said base, and a standby water faucet for connecting with additional multifunction infrared induction water sprinkler.

\* \* \* \* \*